(12) United States Patent
Choe

(10) Patent No.: US 10,952,425 B2
(45) Date of Patent: Mar. 23, 2021

(54) BED BUG MONITOR

(71) Applicant: The Regents of the University of California, Oakland, CA (US)

(72) Inventor: Dong-Hwan Choe, Riverside, CA (US)

(73) Assignee: The Regents of the University of California, Oakland, CA (US)

(*) Notice: Subject to any disclaimer, the term of this patent is extended or adjusted under 35 U.S.C. 154(b) by 710 days.

(21) Appl. No.: 15/486,205

(22) Filed: Apr. 12, 2017

(65) Prior Publication Data

US 2017/0290321 A1 Oct. 12, 2017

Related U.S. Application Data

(60) Provisional application No. 62/321,630, filed on Apr. 12, 2016.

(51) Int. Cl.
| | | |
|---|---|---|
| *A01M 1/14* | (2006.01) | |
| *A01M 1/10* | (2006.01) | |
| *A01M 1/02* | (2006.01) | |

(52) U.S. Cl.
CPC .............. *A01M 1/14* (2013.01); *A01M 1/023* (2013.01); *A01M 1/026* (2013.01); *A01M 1/103* (2013.01); *Y02A 50/30* (2018.01)

(58) Field of Classification Search
CPC ............ A01M 1/00; A01M 1/02; A01M 1/10; A01M 1/103; A01M 1/14
USPC ................... 43/123, 114, 121, 107
See application file for complete search history.

(56) References Cited

U.S. PATENT DOCUMENTS

| | | | | |
|---|---|---|---|---|
| 600,530 | A * | 3/1898 | Harig ...................... | A01M 1/14 43/115 |
| 790,620 | A * | 5/1905 | Crofford .................. | A01M 1/02 43/115 |
| 1,259,911 | A * | 3/1918 | Seibert ................... | A01M 1/103 43/131 |
| 1,261,842 | A * | 4/1918 | Muller ........................... | 43/123 |
| 1,614,153 | A * | 1/1927 | Pierpoint ................. | A01M 1/14 43/115 |
| 3,304,646 | A * | 2/1967 | Staley .................... | A01M 1/106 43/131 |
| 4,031,654 | A * | 6/1977 | Gray ....................... | A01M 1/02 43/114 |
| 4,217,722 | A * | 8/1980 | McMullen .............. | A01M 1/14 43/114 |
| 4,709,504 | A * | 12/1987 | Andric .................... | A01M 1/14 43/114 |
| 4,819,371 | A * | 4/1989 | Cohen .................. | A01M 1/2005 43/114 |
| 5,042,194 | A * | 8/1991 | Cohen .................. | A01M 1/2011 43/107 |

(Continued)

FOREIGN PATENT DOCUMENTS

| | | | | |
|---|---|---|---|---|
| CA | 3037504 | A1 * | 3/2018 | ............. A01M 1/02 |
| GB | 2210543 | A * | 6/1989 | ............. A01M 1/14 |

(Continued)

OTHER PUBLICATIONS

Translation of JP 09-154465 (Year: 1997).*

*Primary Examiner* — Darren W Ark
(74) *Attorney, Agent, or Firm* — Gavrilovich, Dodd & Lindsey LLP

(57) ABSTRACT

The disclosure provides for a bed bug monitor that allows for detection and capture of bed bugs, and uses thereof.

17 Claims, 2 Drawing Sheets

(56) References Cited

U.S. PATENT DOCUMENTS

| | | | | |
|---|---|---|---|---|
| 5,119,586 A | * | 6/1992 | Townsend | A01M 1/023 43/114 |
| 5,454,186 A | * | 10/1995 | Gang | A01M 1/14 43/114 |
| 7,676,985 B1 | * | 3/2010 | Perkins | A01M 1/026 43/114 |
| 8,413,370 B2 | * | 4/2013 | Messian | A01M 1/14 43/114 |
| 9,226,488 B2 | * | 1/2016 | Schumacher | A01M 1/14 |
| 9,737,065 B1 | * | 8/2017 | Hottel | A01M 1/14 |
| 10,098,337 B2 | * | 10/2018 | Yans | A01M 1/14 |
| 10,123,534 B2 | * | 11/2018 | Olson | A01M 1/026 |
| 10,314,299 B2 | * | 6/2019 | Ikawa | F24V 30/00 |
| 10,342,359 B2 | * | 7/2019 | Wieler | A47C 19/025 |
| 2001/0001353 A1 | * | 5/2001 | Jones | A01M 1/14 43/114 |
| 2007/0044372 A1 | * | 3/2007 | Lang | A01M 1/023 43/114 |
| 2009/0223115 A1 | * | 9/2009 | Lang | A01M 1/023 43/114 |
| 2010/0212213 A1 | * | 8/2010 | Hope | A01M 1/026 43/123 |
| 2012/0012046 A1 | * | 1/2012 | Cain | A01M 1/026 116/200 |
| 2012/0167309 A1 | * | 7/2012 | Heidorn | A01M 1/103 5/691 |
| 2012/0210628 A1 | * | 8/2012 | Park | A01M 1/14 43/114 |
| 2012/0291336 A1 | * | 11/2012 | Friend | A01M 1/14 43/114 |
| 2012/0291337 A1 | * | 11/2012 | Curcio | A01M 1/14 43/114 |
| 2013/0031825 A1 | * | 2/2013 | Dass | A01M 1/14 43/114 |
| 2015/0007485 A1 | * | 1/2015 | Hortel | A01M 1/023 43/114 |

FOREIGN PATENT DOCUMENTS

| | | | | | |
|---|---|---|---|---|---|
| GB | 2443701 A | * | 5/2008 | | A01M 1/103 |
| JP | 07327573 A | * | 12/1995 | | |
| JP | 08051910 A | * | 2/1996 | | |
| JP | 09154465 A | * | 6/1997 | | |
| JP | 09322685 A | * | 12/1997 | | |
| JP | 2001078643 A | * | 3/2001 | | |
| JP | 2002000155 A | * | 1/2002 | | |
| JP | 2006075025 A | * | 3/2006 | | |
| JP | 2006136296 A | * | 6/2006 | | |
| JP | 2007097408 A | * | 4/2007 | | |
| KR | 20030021227 A | * | 3/2003 | | |
| KR | 20030043843 A | * | 6/2003 | | |
| WO | WO-2010082043 A1 | * | 7/2010 | | A01M 1/026 |
| WO | WO-2012064426 A1 | * | 5/2012 | | A01M 1/026 |
| WO | WO-2017154702 A1 | * | 9/2017 | | A01N 25/34 |

* cited by examiner

BED BUG MONITOR

CROSS REFERENCE TO RELATED APPLICATIONS

This application claims priority under 35 U.S.C. § 119 to U.S. Provisional Application Ser. No. 62/321,630, filed on Apr. 12, 2016, the disclosure of which is incorporated herein by reference in its entirety.

FIELD OF THE INVENTION

The disclosure provides for a bed bug monitor that allows for detection and capture of bed bugs, and uses thereof.

BACKGROUND

The problem of bed bug infestations is growing and is gaining increasing public awareness. Better means of detecting bed begs and their increasing resistance to chemicals and insecticides dictates that additional control means are required.

SUMMARY

This disclosure provides for a bed bug monitor that allows for detection and capture of bed bugs.

In a particular embodiment, the disclosure provides for a bed bug monitor capable of detecting and capturing bed bugs comprising: an upper panel comprising an upper inner surface and an upper outer surface and wherein the upper inner surface comprises a sticky trapping element; and a lower panel comprising a lower inner surface and a lower outer surface, wherein the lower inner surface comprises a behavior modifying element, wherein the upper inner surface is directly across from the lower inner surface, wherein at least a portion of the distance between the upper inner surface and the lower inner surface is slightly larger than the average height of an adult bed bug, and wherein the sticky trapping element is positioned above the behavior modifying element. In a further embodiment, a bed bug monitor disclosed herein further comprises: one or more spacers that are contact with the upper inner surface and the lower inner surface, wherein the spacers have a height just slightly larger than the average height of an adult bed bug. In yet a further embodiment, the sticky trapping element is selected from the group consisting of non-drying adhesive, non-drying glue, and non-drying resin. In a certain embodiment, the behavior modifying element is an insecticide or irritant that is diluted to level that induces a bed bug to raise up its abdomen and/or thorax so as not to come into contact with the behavior modifying element, and wherein the behavior modifying element is not used at a strength that induces a bed bug to completely avoid coming into contact with the behavior modifying element. In another embodiment, the behavior modifying element is a pyrethoid insecticide that has been diluted to a lower concentration than typically used. In yet another embodiment, the distance between the upper inner surface to lower inner surface is between 1 mm to 5 mm. In a further embodiment, a bed bug monitor of the disclosure is made of plastic, cardboard, or a mixture thereof. In yet a further embodiment, the central portion of the upper inner surface comprises the sticky trapping element, and wherein the central portion of the lower inner surface comprises the behavior modifying element. In a particular embodiment, the lower inner surface and/or upper inner surface further comprises one or more bed bug attractants. In a further embodiment, the bed bug attractant is found at or near the center of the bed bug monitor, and wherein the bed bug attractant is surrounded by the sticky trap element and the behavior modifying element. In yet a further embodiment, the one or more bed bug attractants are selected from the group consisting of hexanal, octenal, nonanal, dimethyl disulfide, dimethyl trisulfide, butyric acid, 1-octen-3-ol, 2-hexanone, and any combination of the foregoing. In another embodiment, at least the central portion of the upper panel and/or at least the central portion of the lower panel is transparent. In yet another embodiment, the lower inner surface is texturized or rough. In a certain embodiment, the bed bug monitor is substantially cuboid in shape.

DETAILED DESCRIPTION

Figure 1:
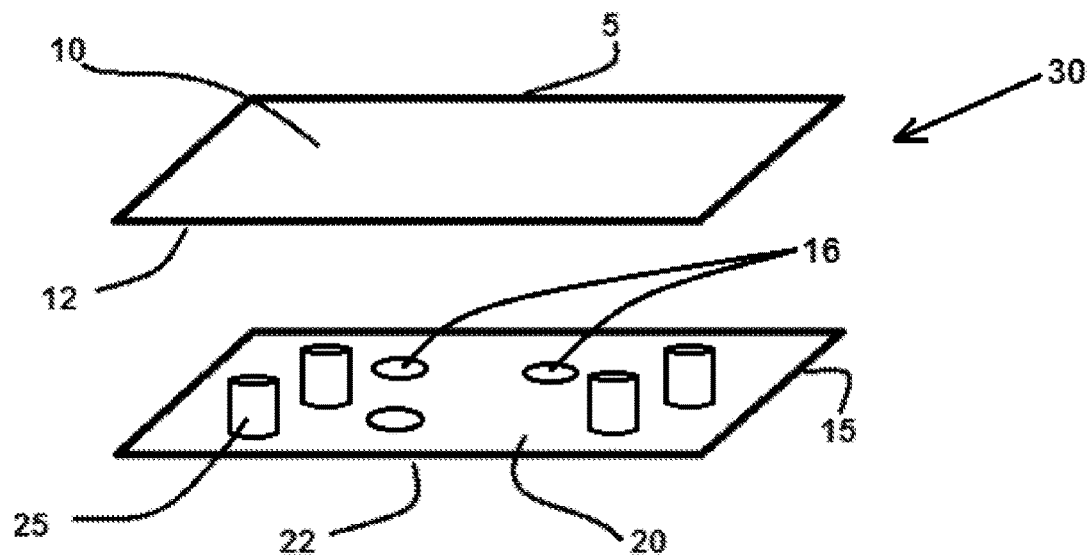
FIG. 1 provides side angle views of exemplary embodiments of an upper panel and lower panel of a bed bug monitor of the disclosure.

As used herein and in the appended claims, the singular forms "a," "an," and "the" include plural referents unless the context clearly dictates otherwise. Thus, for example, reference to "a bed bug monitor" includes a plurality of such bed bug monitors and reference to "the panel" includes reference to one or more panels known to those skilled in the art, and so forth.

Also, the use of "or" means "and/or" unless stated otherwise. Similarly, "comprise," "comprises," "comprising" "include," "includes," and "including," and "have," "haves," and "having," are interchangeable and not intended to be limiting.

It is to be further understood that where descriptions of various embodiments use the term "comprising," those skilled in the art would understand that in some specific instances, an embodiment can be alternatively described using language "consisting essentially of" or "consisting of."

Bed bugs are small nocturnal insects of the family Cimicidae that feed off the blood of humans and other warm blooded hosts. Bed bugs exhibit cryptic behavior, which makes their detection and control difficult and time consuming. This is particularly true for the common bug, Cimex lectularius, which has become well adapted to human environments. Other species of bed bugs have been controlled in many areas, such as the United States; however, the increase in international travel has contributed to a resurgence of these pests in recent years.

While adult bed bugs do not fly, they can move quickly over surfaces. Bed bugs tend to congregate but do not build nests like some other insects. Bed bugs are able to cling to possessions and hide in small spaces, such that they may be transported in a traveler's belongings. As a result, buildings where the turnover of occupants is high, such as hotels, motels, inns, barracks, cruise ships, shelters, nursing homes, camp dwellings, dormitories, condominiums and apartments, are especially vulnerable to bed bug infestations. Professional pest removal specialists and pesticides are typically needed. While the pesticide application is often an important tool to achieve an immediate relief from a bed bug infestation, early detection of bed bugs would certainly reduce the potential risks associated with the pesticides by making low impact management strategies (e.g., non-chemical tactics) possible and effective. Also, early detection can aid in mitigating the need for fumigation.

The disclosure provides for bed bug monitors that are capable of detecting and capturing bed bugs. The bed bug monitors disclosed herein exploit behavioral and/or physiological changes of bed bugs in response to behavior-modifying compounds.

Most of the current sticky traps are ineffective in detecting low infestations of bed bugs. If the bed bugs encounter the glue substance on the sticky trap, they immediately stop walking and move backwards to escape. Most of the traps are optimized to capture insects that can run, jump, or fly. Thus, commonly available sticky traps (e.g., sticky traps for roaches, ants, flies and the like) are not particularly suited for detecting and/or capturing bed bugs. By contrast, the bed bug monitors disclosed herein have been engineered to take advantage of bed bug behaviors so as to maximize the effectiveness of the bed bug monitors.

In a particular embodiment, the disclosure provides for a bed bug monitoring device comprising: (a) an upper inner surface comprising a sticky trapping element; and (b) a lower inner surface comprising a behavior modifying element, wherein the sticky trapping element is positioned above the behavior modifying element, and wherein at least a portion of the distance between the upper inner surface comprising a sticky trapping element and the lower inner surface comprising a behavior modifying element is slightly larger than the average height of an adult bed bug. In a further, embodiment, the lower inner surface and/or the upper inner surface is sloped, so that portions of the distance between the upper inner surface comprising a sticky trapping element and the lower inner surface comprising a behavior modifying element go from slightly larger than the average height of an adult bed bug to less than the average height of an adult bed bug (e.g., slightly more than the average height of recently hatched nymph) (see, e.g., FIG. 4).

The bed bug monitor disclosed herein can be any shape, any size and/or any design, as long as it comprises the features of: an upper inner surface comprising a sticky trapping element; and (b) a lower inner surface comprising a behavior modifying element, wherein the sticky trapping element is positioned above the behavior modifying element, and wherein at least a portion of the distance between the upper inner surface comprising a sticky trapping element and the lower inner surface comprising a behavior modifying element is slightly larger than the average height of an adult bed bug. Moreover, the bed bug monitor can be made of any type of material, such as cardboard, plastic, glass, metal, etc., or combinations of materials. Typically, the bed bug monitor disclosed herein is comprised of inexpensive disposable materials such as cardboard or plastic.

For a bed bug monitor disclosed herein, the inner surfaces of the monitor can be smooth or rough, or portions of which that are rough, and portions of which are smooth. Typically, bed bugs prefer walking on texturized surfaces versus smooth surfaces. Accordingly, in a certain embodiment, the lower inner surface of the bed bug monitor disclosed herein has a texturized or rough surface.

In a particular embodiment, the behavior modifying element comprises one or more compounds that induce a "body lifting response" in a bed bug. Such a response is related to avoidance behavior, in that the bed bug is avoiding contact with the behavior modifying element but not to such a level that the bed bug completely avoids walking or crawling over the behavior modifying element. It has been found that certain compounds, such as irritants and pesticides, when used at a low enough concentration will induce a "body lifting response" as opposed to complete avoidance behavior in a bed bug, in that the bed bug still walks across the lower inner surface comprising the behavior modifying element but lifts up its thorax and/or abdomen to avoid coming into contact with the behavior modifying element. In particular, it has been found that pyrethroid insecticides, a commonly employed class of pesticides for bed bugs, will induce a "body lifting response" in a bed bug when a diluted to a lower concentration than typically used. Accordingly, the disclosure provides in certain embodiments for a bed bug monitor disclosed herein, at least some portion of lower inner surface comprises one or more compounds that induce a "body lifting response." For example, a diluted pyrethroid insecticide may be applied to some portion of the lower inner surface of a bed bug monitor disclosed herein.

In further embodiments, an inner surface or a separate internal structure (i.e., baiting station) within the bed bug monitor may further comprise one or more compounds that are used to attract bed bugs (i.e., bed bug attractants). The bed bug monitor disclosed herein may comprise any bed bug attractant that is effective in attracting bed bugs. Attractants which may be employed, include, but are not limited to, carbon dioxide, heat, pheromones, human sweat components and the like, all of which are known to those of skill in the art. Mixtures of one or more attractants may also be employed. In a further embodiment, the bed bug attractant comprises one or more unsaturated aldehyde components, like hexanal, octenal and nonanal, and one or more other compounds selected from dimethyl disulfide, dimethyl trisulfide, butyric acid, 1-octen-3-ol, and 2-hexanone. Typically, the attractant(s) should be placed in an inner portion of the bed bug monitor so that the bed bug has to walk across the lower inner surface comprising the behavior modifying element in order to reach the source of attractants. However, in certain embodiments, the behavior modifying element itself may further comprise the bed bug attractant(s).

In other embodiments, one or more inner surfaces of a bed bug monitor disclosed herein may further comprise a bed bug arrestant. Examples of a bed bug arrestant include, but are not limited to histamine.

For a bed bug monitor disclosed herein, a portion of the top inner surfaces comprises a sticky trapping element. Typically, sticky trapping elements comprises non-drying glue, non-drying adhesive, non-drying resin, or a mixture of any of the foregoing. Any typically employed glue, adhesive, or resin used for pest control (e.g., mice, roaches, flies, etc.) can be used with the bed bug monitors disclosed herein.

In regards to the operation of a bed bug monitor disclosed herein, bed bugs which enter the bed bug monitor will encounter the behavior-modifying chemical residues on the lower inner surface (i.e., the floor of the trap) will immediately elicit the bed bugs' behavioral/physiological change. The behavior of interest is the "body-lifting" response. Some irritants or insecticide residues at low rates can immediately modify the stance of bed bugs when they contact the treated surface. For example, the bed bugs lift their body higher while walking on the surface treated with, e.g., some pyrethroid insecticides. Depending upon the rates and formulations, these residues can be prepared as non-repellent surface so that the bed bugs still walk on the treated surface upon contact. In the second step, this sub-lethal effect of insecticide is exploited to facilitate the capture (or retention) of the bed bugs within the trap. More specifically, the bed bugs with "raised stance" will be captured on the sticky trap element placed above them. Because of their flat body shape, the bed bugs captured in this manner would never be able to escape. The distance between the bottom and top of the trap is a distance associated with the bug size to increase the chance of capturing the bed bugs with "raised stance" while not preventing the bed bugs from entering the trap (i.e., the distance is slightly greater than the average height of a bed bug). In studies looking at the performance of bed bug monitor in comparison with that of a conventional stick trap (i.e., sticky surface at bottom), the bed bug monitor of the disclosure consistently captured numerous bed bugs while the conventional sticky traps did not capture any.

In a particular embodiment, the bed bug monitoring traps can be placed where the bed bugs are potentially present (e.g., under mattresses, on bed frames, or along carpet edges). Even in some embodiments, the bed bug monitoring traps can be incorporated into the structure as a part of baseboard. This can serve as a "built-in" pest monitors.

The accompanying drawings, which are incorporated into and constitute a part of this specification, illustrate one or more, non-limiting, embodiments of the disclosure and, together with the detailed description, serve to explain the principles and implementations of a bed bug monitor of the disclosure. Like reference symbols in the various drawings indicate like elements.

Close-up views of exemplary panels making up the bed bug monitor 30 of the disclosure are presented in FIG. 1. As shown top panel 5 comprises two sides, an upper outer surface 10 and an upper inner surface 12. As shown top panel 5 is rectangular. However, top panel 5 can vary by size and by shape. For example, top panel 5 may be rectangular, square, circular, ovoid, hexagonal, irregular, etc. Generally, top panel 5 can be made of any material, including plastic, metal, cardboard, glass, etc. or any combination of the foregoing so long as it can include an insect adhesive on the inner surface 12. In certain embodiments, top panel 5 and bottom panel 15 have the same color. In an alternate embodiment top panel 5 and bottom panel 15 have a different color. In particular embodiment, it may be desirable for top panel 5 to comprise at least a portion of which, such as the center of top panel 5, to comprise a transparent material, e.g., transparent plastic, glass, etc. Providing such a material can allow for visualizing of trapped bed bugs without having to dissemble the bed bug monitor 30. In such a case, bottom panel 15 should comprise either a transparent material or be of a light color. Alternatively, bottom panel 15, may comprise at least a portion of which, such as the center of bottom panel 15, a transparent material, e.g., transparent plastic, glass, etc. In such a case, top panel 5 should comprise either a transparent material or be of a light color. In another embodiment, top panel 5 and/or bottom panel 15 may fully comprise a transparent material. Moreover, it is further contemplated that this transparent portion of top panel 5 and/or bottom panel 15 may be covered with a removable material or cover on upper outer surface 10 and/or lower outer surface 22, respectively. For example, dark colored tape can be used to cover the transparent material, which can be subsequently removed and/or replaced so as to allow for checking for trapped bed bugs. Top panel 5 comprises upper inner surface 12 which comprises a sticky trap element. Examples of sticky trap elements include but are not limited to, non-drying adhesive, non-drying glue and non-drying resin. For example, portions of upper inner surface 12, such as the center portion, can comprise non-drying adhesive, non-drying glue or non-drying resin. Alternatively, substantially the entire portion of upper inner surface 12 may comprise a sticky trap element. It should be understood that the main purpose of the sticky trap element is to capture bed bugs by adhering the bed bugs to upper inner surface 12 of top panel 5. In certain embodiments, portions of upper inner surface 12, e.g. the center portion, may further comprise a bed bug attractant 18 (see, FIG. 2 callout 18). In yet a further embodiment, the inner surface 12 may comprise a homogenous consistent coat across the whole surface or alternatively may comprise spots or zones of adhesive.

As shown in FIG. 1, bottom panel 15, may further comprise spacers 25 attached to lower inner surface 20 and/or upper inner surface 12. In yet other alternate embodiments, top panel 5 and bottom panel 15, may comprise spacers 25 attached to upper inner surface 12 and/or lower inner surface 20, respectively. As shown, spacers 25 may be cylindrical in shape. However, spacers 25 can have any shape, e.g., cuboid, hexagonal, etc. Spacers 25 are selected to have a uniform height dimension, or alternatively be of varying sizes from taller on the outer portion of top panel 5 and/or bottom 15, but be shorter in the inner portion of top panel 5 and/or bottom panel 15. In both cases, the height of spacers 25 is in the low millimeter range. For example, in certain embodiments the spacers have a height of less than 5 mm, 4.9 mm, 4.8 mm, 4.7 mm, 4.6 mm, 4.5 mm, 4.4 mm, 4.3 mm, 4.2 mm, 4.1 mm, 4.0 mm, 3.9 mm, 3.8 mm, 3.7 mm, 3.6 mm, 3.5 mm, 3.4 mm, 3.3 mm, 3.2 mm, 3.1 mm, 3.0 mm, 2.9 mm, 2.8 mm, 2.7 mm, 2.6 mm, 2.5 mm, 2.4 mm, 2.3 mm, 2.2 mm, 2.1 mm, 2.0 mm, or a range between any two of the foregoing numbers, including fractional increments thereof. The width or diameter dimension of the spacers 25 can be any suitable size, but is typically between 0.05 cm to 3.0 cm and should be space from one another a distance to allow a bed bug to traverse the space between top panel 5 and bottom panel 15. There is no upper limit as to the number of spacers 25 a bed bug monitor 30 may comprise. For example, 5 spacers 25 are shown in FIG. 1, but the bed bug monitor 30 may comprise 1, 2, 3, 4, 5, 6, 7, 8, 9, or 10 spacers 25, or a range between any two of the foregoing numbers. The location of spacers 25 can vary as long as there is space for bed bugs to enter bed bug monitor 30. Typically, spacers 25 can be found at the corners of top panel 5 and bottom panel 15. In regards to lower inner surface 20, at least a portion of lower inner surface 20 comprises a behavior modifying element 16. Examples of behavior modifying elements include but are not limited to, chemical compounds (e.g., insecticides, and irritants), change in temperature, change in surface texture, that induce "body lifting" behavior in bed bugs. For example, portions of lower inner surface 20, such as the center portion or other various locations, can comprise behavior modifying elements 16, such as diluted pyrethroid insecticide. Alternatively, substantially the entire portion of lower inner surface 20 may comprise behavior modifying elements 16. It should be understood that the main purpose of the behavior modifying element 16 is to cause the bed bugs to raise up so that they come into contact with the sticky trap element found on upper inner surface 12 of top panel 5. In certain embodiments, portions of lower inner surface 20, e.g. the center portion, may further comprise a bed bug attractant (see, 18 in, e.g., FIGS. 2 and 4). In other embodiments, lower inner surface 20 can comprise a texturized or rough surface (not shown).

Figure 2:
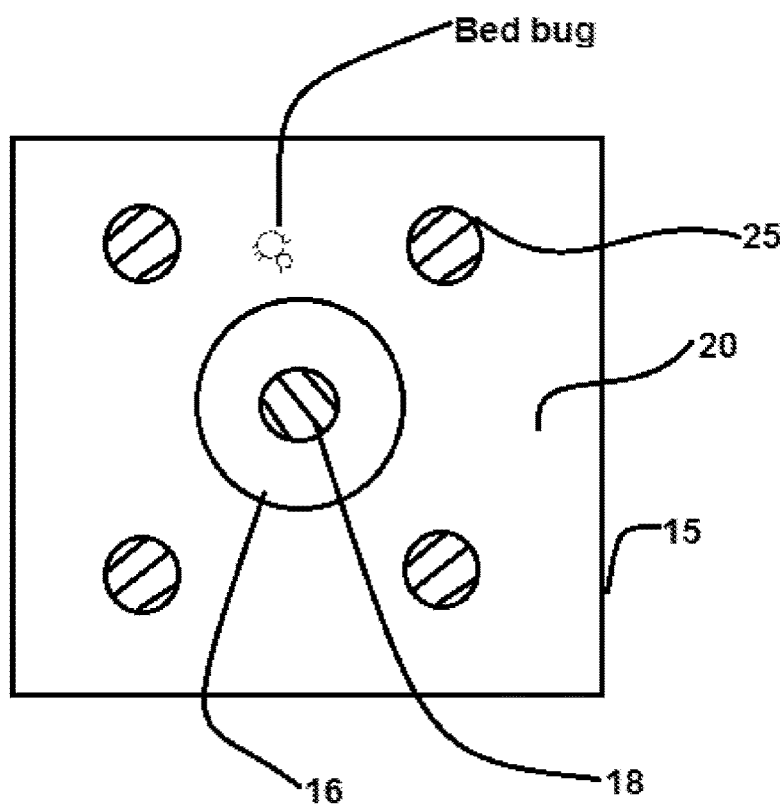
FIG. 2 provides top down view of an exemplary lower panel of a bed bug monitor of the disclosure.

FIG. 2 shows a top down view of the lower inner surface 20 of bottom panel 15. As shown, bottom panel 15 comprises 4 spacers 25 on the corners of lower inner surface 20. Lower inner surface 20 is shown as comprising behavior modifying element 16 which further comprises bed bug attractant 18. Behavior modifying element 16 can be applied to the lower inner surface 20 using common application means, such as spraying, depositing, painting, etc. Alternatively, behavior modifying element 16 and/or bed bug attractant 18 can be indirectly attached to lower inner surface 20 by being applied or deposited on a separate thin structure such as a membrane, paper, film that is then affixed to the lower inner surface 20. Bed bug attractant 18 can be provided separately from behavior modifying element 16. Bed bug attractant 18 is only height limited by the distance between lower inner surface 20 and upper inner surface 12. Accordingly, bed bug attractant can be applied to a thicker structure than behavior modifying element 16. Moreover, one or more spacers 25 found at or near the center of the lower inner surface 20 may comprise bed bug attractant 18. As shown, only the central portion of lower inner surface 20 comprises behavior modifying element 16. However, it should be understood that behavior modifying element 16 may be applied to any size portion of lower inner surface 20, including being applied up to the entire portion of lower inner surface 20.

Figure 3:
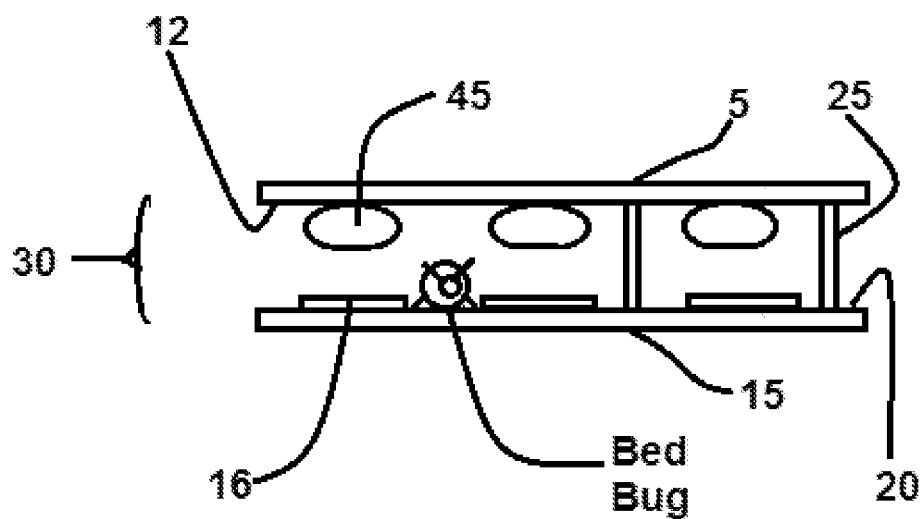
FIG. 3 provides a side view of an exemplary bed bug monitor of the disclosure.

FIG. 3 demonstrates an exemplary embodiment of an assembled bed bug monitor 30 of the disclosure. As shown, top panel 5 and bottom panel 15 are separated by a minimal distance. In particular, the distance between upper inner surface 12 of top panel 5 and inner surface 20 of bottom panel 15 is just slightly larger than the average height of a bed bug. To achieve a proper distance, spacers 25 of appropriate height may be used. Accordingly, bed bug monitor 30 has a very low profile by being very thin. In a particular embodiment, bed bug monitor 30 may be designed so that top panel 5 and bottom panel 15 are not readily detachable from one another. In an alternate embodiment, bed bug monitor 30 may be designed so that top panel 5 is easily detachable from bottom panel 15. Such a design can include use of parts that can be slideably inserted into one another to form a somewhat tight fit, that can then be reversed by pulling top panel 5 apart from bottom panel 15. For example, top panel 5 can comprise spacers 25 that can be slideably inserted into or around spacers 25 found on bottom panel 15.

FIG. 3 also shows adhesive 45 located above behavior modifying element 16. In use a bed bug will raise its body up as it encounters behavior modifying element 16 and its body will come into contact with adhesive 45 thus trapping the bed bug. As mentioned above, adhesive 45 may be spotted on upper inner surface 12 or may be coated across the whole inner surface of 12.

Figure 4:
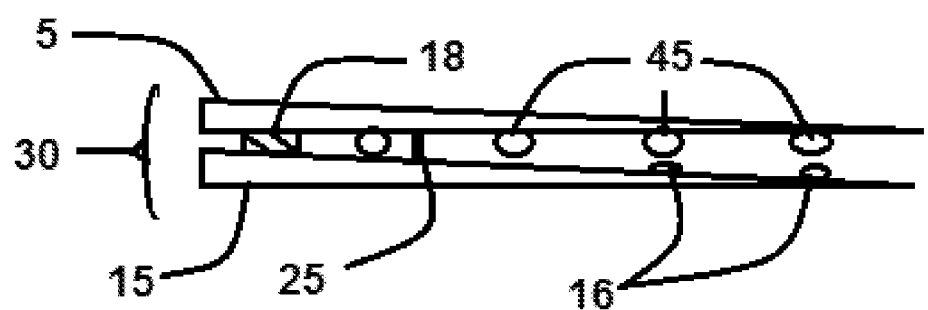
FIG. 4 shows an embodiment of an exemplary bed bug monitor having a tapered configuration.

FIG. 4 shows another embodiment, wherein the monitor 30 comprises a dimension that is tapered such that different sized bed bugs may be trapped appropriately. FIG. 4 shows spacers 25 along with an attractant 18 at the narrowest portion of the trap 30. Also show are behavior modifying element 16 located below adhesive 45. In use, various sized bed bugs will be trapped as they proceed towards attractant 18, wherein larger bed bugs will be trapped where the width is greater and smaller, more juvenile, bed bugs will be trapped at the narrow portions of the trap 30.

A number of embodiments of the invention have been described. Nevertheless, it will be understood that various modifications may be made without departing from the spirit and scope of the invention. Accordingly, other embodiments are within the scope of the following claims.

What is claimed is:

1. A bed bug monitor capable of detecting and capturing bed bugs comprising:
    an upper panel comprising an upper inner surface and an upper outer surface and wherein the upper inner surface comprises a sticky trapping element; and
    a lower panel comprising a lower inner surface and a lower outer surface, wherein the lower inner surface comprises a non-adhesive behavior modifying element,
    wherein the upper inner surface is directly opposite from the lower inner surface, wherein at least a portion of the distance between the upper inner surface and the lower inner surface is slightly larger than an average height of an adult bed bug,
    wherein the sticky trapping element is positioned above the behavior modifying element, and
    wherein the behavior modifying element is an insecticide or irritant that is diluted to a level that induces a bed bug to raise up its abdomen and/or thorax so as not to come into contact with the behavior modifying element, and wherein the behavior modifying element is not used at a strength that induces the bed bug to completely avoid coming into contact with the behavior modifying element.

2. The bed bug monitor of claim 1, wherein the bed bug monitor further comprises:
    one or more spacers that are in contact with the upper inner surface and the lower inner surface,
    wherein the one or more spacers have a height just slightly larger than the average height of an adult bed bug.

3. The bed bug monitor of claim 1, wherein the sticky trapping element is selected from the group consisting of non-drying adhesive, non-drying glue, and non-drying resin.

4. The bed bug monitor of claim 1, wherein the behavior modifying element is a pyrethoid insecticide that has been diluted to a concentration less that a lethal concentration for bed bugs.

5. The bed bug monitor of claim 1, wherein the distance between the upper inner surface to the lower inner surface is between 1 mm to 5 mm.

6. The bed bug monitor of claim 1, wherein the bed bug monitor is made of plastic, cardboard, or a mixture thereof.

7. The bed bug monitor of claim 1, wherein a central portion of the upper inner surface comprises the sticky trapping element, and wherein a central portion of the lower inner surface comprises the behavior modifying element.

8. The bed bug monitor of claim 1, wherein the lower inner surface and/or the upper inner surface further comprises one or more bed bug attractants.

9. The bed bug monitor of claim 8, wherein the one or more bed bug attractants are found at or near a center of the bed bug monitor, and wherein the one or more bed bug attractants are surrounded by or at a position that requires the bed bug to traverse the sticky trapping element and the behavior modifying element.

10. The bed bug monitor of claim 8, wherein the one or more bed bug attractants are selected from the group consisting of hexanal, octenal, nonanal, dimethyl disulfide, dimethyl trisulfide, butyric acid, 1-octen-3-ol, 2-hexanone, and any combination of the foregoing.

11. The bed bug monitor of claim 1, wherein at least a central portion of the upper panel and/or at least a central portion of the lower panel is transparent.

12. The bed bug monitor of claim 1, wherein the lower inner surface is texturized or rough.

13. The bed bug monitor of claim 1, wherein the bed bug monitor is substantially cuboid in shape.

14. The bed bug monitor of claim 1, wherein the behavior modifying element causes a bed bug to raise its body to make contact with the upper inner surface.

15. The bed bug monitor of claim 1, wherein the behavior modifying element is the insecticide having a concentration level less than a lethal concentration for bed bugs.

16. The bed bug monitor of claim 15, wherein the insecticide has the concentration level sufficiently high to induce the bed bug to raise its body to make contact with the upper inner surface.

17. The bed bug monitor of claim 16, wherein the insecticide has the concentration level below a concentration that induces the bed bug to avoid the trap.

* * * * *